US 9,172,709 B2

(12) United States Patent
Dean et al.

(10) Patent No.: US 9,172,709 B2
(45) Date of Patent: Oct. 27, 2015

(54) SECURE NETWORK PORTAL

(75) Inventors: Irvin L. Dean, Palm Harbor, FL (US); Randall S. Brooks, Apollo Beach, FL (US)

(73) Assignee: Raytheon Company, Waltham, MA (US)

( * ) Notice: Subject to any disclaimer, the term of this patent is extended or adjusted under 35 U.S.C. 154(b) by 858 days.

(21) Appl. No.: 12/145,363

(22) Filed: Jun. 24, 2008

(65) Prior Publication Data

US 2009/0320115 A1 Dec. 24, 2009

(51) Int. Cl.
*G06F 7/04* (2006.01)
*H04L 29/06* (2006.01)
*H04L 29/08* (2006.01)

(52) U.S. Cl.
CPC ............ *H04L 63/105* (2013.01); *H04L 63/168* (2013.01); *H04L 67/16* (2013.01)

(58) Field of Classification Search
CPC ... H04L 9/088; H04L 29/0685; H04L 63/105; G06F 2221/2113
USPC .......................................................... 726/4
See application file for complete search history.

(56) References Cited

U.S. PATENT DOCUMENTS

| 6,085,324 | A * | 7/2000 | Ogram ............................ 726/5 |
| 6,367,013 | B1 | 4/2002 | Bisbee et al. |
| 1,205,927 | A1 | 10/2006 | Beyda et al. |
| 7,127,741 | B2 | 10/2006 | Bandini et al. |
| 7,131,000 | B2 | 10/2006 | Bradee |
| 7,174,363 | B1 | 2/2007 | Goldstein et al. |
| 7,308,101 | B2 | 12/2007 | Wing |
| 7,328,351 | B2 | 2/2008 | Yokota et al. |
| 7,346,923 | B2 | 3/2008 | Atkins et al. |
| 7,444,672 | B2 * | 10/2008 | Ellmore ............................ 726/8 |
| 7,451,163 | B2 | 11/2008 | Selman et al. |
| 7,467,399 | B2 | 12/2008 | Nadalin et al. |
| 7,472,413 | B1 | 12/2008 | Mowshowitz |
| 7,505,482 | B2 | 3/2009 | Adamczyk et al. |
| 7,571,473 | B1 * | 8/2009 | Boydstun et al. ................ 726/21 |
| 2002/0169874 | A1 * | 11/2002 | Batson et al. .................. 709/225 |

(Continued)

FOREIGN PATENT DOCUMENTS

| EP | 1 280 316 | 1/2003 |
| EP | 1 635 524 | 3/2006 |

(Continued)

OTHER PUBLICATIONS

Ricardo J. Rodriguez, et al., *Secure E-Mail Messaging System*, U.S. Appl. No. 12/176,935, filed Jul. 21, 2008.

(Continued)

*Primary Examiner* — Esther B Henderson
(74) *Attorney, Agent, or Firm* — Schwegman Lundberg & Woessner, P.A.

(57) ABSTRACT

According to one embodiment, a secure network portal includes a number of application servers coupled to one or more clients through a portal server. The application servers serve a number of secure services that may be consumed by clients. The portal server creates a login session with a graphical user interface in which the login session is associated with a particular authorization level. The portal server then displays a service access point for each of the plurality of secure services and restricts access to each of the secure services according to the authorization level of the login session.

20 Claims, 3 Drawing Sheets

(56) References Cited

U.S. PATENT DOCUMENTS

| | | | |
|---|---|---|---|
| 2003/0126558 | A1 | 7/2003 | Griffin |
| 2003/0163733 | A1 | 8/2003 | Barriga-Caceres et al. |
| 2003/0177390 | A1* | 9/2003 | Radhakrishnan ............ 713/201 |
| 2003/0188167 | A1 | 10/2003 | Kurosaki et al. |
| 2004/0111519 | A1 | 6/2004 | Fu et al. |
| 2004/0230831 | A1 | 11/2004 | Spelman et al. |
| 2005/0044197 | A1 | 2/2005 | Lai |
| 2005/0132070 | A1 | 6/2005 | Redlich et al. |
| 2005/0149496 | A1 | 7/2005 | Mukherjee et al. |
| 2005/0198412 | A1 | 9/2005 | Pedersen et al. |
| 2006/0059529 | A1* | 3/2006 | Bernardi et al. ............ 725/132 |
| 2006/0236365 | A1 | 10/2006 | Pham |
| 2007/0245409 | A1 | 10/2007 | Harris et al. |
| 2007/0250921 | A1 | 10/2007 | LiVecchi |
| 2008/0028440 | A1* | 1/2008 | Basol et al. ........................ 726/3 |
| 2008/0072290 | A1 | 3/2008 | Metzer et al. |
| 2008/0092223 | A1* | 4/2008 | Setia et al. ...................... 726/11 |
| 2008/0126799 | A1 | 5/2008 | Winig |
| 2009/0319782 | A1 | 12/2009 | Lee |
| 2010/0146608 | A1 | 6/2010 | Batie et al. |

FOREIGN PATENT DOCUMENTS

| | | |
|---|---|---|
| GB | 2 421 156 | 6/2006 |
| WO | WO 2005/096543 | 10/2005 |

OTHER PUBLICATIONS

Anthony J. DelRocco, et al., *Multi-Level Secure Information Retrieval System*; U.S. Appl. No. 12/329,407, filed Dec. 5, 2008.

Eric S. Dickson, et al., *Multi-Level Secure Network*; U.S. Appl. No. 61/078,220, filed Jul. 3, 2008.

Notification of Transmittal of the International Search Report and the Written Opinion of the International Searching Authority, or the Declaration for PCT/US2009/043684 (12 pages), Mar. 5, 2010.

Intellectual Property Office, South Wales, NP10 8QQ; Examination Report under section 18(3); re: Application No. GB1100172.4; dated Apr. 21, 2011; 1 page, Apr. 21, 2011.

"New Zealand Application Serial No. 590305, Response filed Apr. 18, 2013 to Examination Report mailed Apr. 3, 2013", 4 pgs.

"New Zealand Application Serial No. 590305, Further Examination Report mailed Apr. 3, 2013", 2 pgs.

Notification of Transmittal of the International Search Report and the Written Opinion of the International Searching Authority, or the Declaration for PCT/US2009/049485, Dec. 7, 2009.

Notification of Transmittal of the International Search Report and the Written Opinion of the International Searching Authority, or the Declaration for PCT/US2009/047588, Oct. 23, 2009.

Notification of Transmittal of the International Search Report and the Written Opinion of the International Searching Authority, or the Declaration for PCT/US2009/063021, Feb. 25, 2010.

USPTO Office Action for U.S. Appl. No. 12/496,444, Sep. 20, 2010.

USPTO Office Action for U.S. Appl. No. 12/496,444, Mar. 10, 2011.

USPTO Response to Office Action for U.S. Appl. No. 12/496,444 mailed Mar. 10, 2011, May 10, 2011.

USPTO Advisory Action for U.S. Appl. No. 12/496,444, May 25, 2011.

USPTO Pre Appeal Brief for U.S. Appl. No. 12/496,444, Jun. 10, 2011.

USPTO Decision for U.S. Appl. No. 12/496,444, Aug. 17, 2011.

USPTO Appeal Brief for U.S. Appl. No. 12/496,444, Sep. 19, 2011.

USPTO Examiner's Answer for U.S. Appl. No. 12/496,444, Nov. 14, 2011.

USPTO Office Action for U.S. Appl. No. 12/176,935, Mar. 2, 2011.

USPTO Final Office Action for U.S. Appl. No. 12/176,935, Sep. 8, 2011.

USPTO Office Action for U.S. Appl. No. 12/329,407, May 19, 2011.

USPTO Office Action for U.S. Appl. No. 12/329,407, Nov. 2, 2011.

Manual, *"Protecting Sensitive Compartmented Information Within Information Systems (Dcid 6/3)—Manual,"* Table of Contents through 9.G.7, for Official Use Only, May 24, 2000.

Brochure, *"Digital Small Switch"* (DSS-2A), Raytheon, St. Petersburg, Florida, 2006.

R. Housley, Vigil Security: "Using Advanced Encryption Standard (AES) CCM Mode with IPsec Encapsulating Security Payload (ESP)"; rfc 4309.txt, IETF Standard, Internet Engineering Task Force, IETF, CH, Dec. 1, 2005.

Gabber et al., How to make personalized web browsing simple, secure, and anonymous, Financial Cryptography Lecture Notes in Computer Sciences, 1997, vol. 1318/1997, 17-31., 1997.

"Great Britain Application Serial No. GB1100172.4, Examination Report mailed Apr. 21, 2011", 1 pg.

"Great Britain Application Serial No. GB1100172.4, Examination Report mailed Oct. 5, 2011", 5 pgs.

"Great Britain Application Serial No. GB1100172.4, Response filed Feb. 3, 2012 to Office Action mailed Oct. 5, 2011", 18 pgs.

"Great Britain Application Serial No. GB1100172,4, Response filed Aug. 22, 2011 to Examination Report mailed Apr. 21, 2011", 18 pgs.

"International Application Serial No. PCT/US2009/043684, International Preliminary Report on Patentability dated Jan. 5, 2011", 6 pgs.

"New Zealand Application Serial No. 590305, Examiner Report mailed Jul. 10, 2012", 2 pgs.

Nguyen, T. D, et al,, "MYSEA testbed", *Proceedings of the 2005 IEEE Workshop on Information Assurance and Security, United States Military Academy*, West Point, NY, (2005), 438-439.

"New Zealand Application Serial No. 590305, Response filed Mar. 10, 2013 to First Examiner Report mailed Jul. 10, 2012", 38 pgs.

Intellectual Property Office, South Wales, NT10 8QQ; Examination Report under section 18(3); re: Application No. GB1100172.4; dated Oct. 5, 2011; 3 pages, Oct. 5, 2011.

"Canadian Application Serial No. 2,727,269 Response filed May 14, 2015 to Office Action mailed Mar. 31, 2015", With the pending claims, 13 pgs.

"Canadian Application Serial No. 2,727,269, Office Action mailed Mar. 31, 2015", 5 pgs.

* cited by examiner

SECURE NETWORK PORTAL

TECHNICAL FIELD OF THE DISCLOSURE

This disclosure generally relates to networks, and more particularly, to a secure network portal that provides secure services to clients and a method of using the same.

BACKGROUND OF THE DISCLOSURE

Computing systems used by organizations typically incorporate numerous services to perform various useful services, such as e-mail messaging services, word processing services, and/or computer aided design (CAD) services. To enhance performance and maintainability, services of computing systems may be configured to operate in a client/server model in which their execution is shared between a server and a client. Services of distributed computing systems may incorporate various levels of security to protect the organization's information from illicit use. Due to the relatively disparate nature of these services, security is often applied individually through each service.

SUMMARY OF THE DISCLOSURE

According to one embodiment, a secure network portal includes a number of application servers coupled to one or more clients through a portal server. The application servers serve a number of secure services that may be consumed by clients. The portal server creates a login session with a graphical user interface in which the login session is associated with a particular authorization level. The portal server then displays a service access point for each of the plurality of secure services and restricts access to each of the secure services according to the authorization level of the login session.

Some embodiments of the invention provide numerous technical advantages. For example, in one embodiment, secure network portal provides access to a number of services through a single graphical user interface. Following a login procedure, a user has access to services at a level corresponding to his or her authorization level that is determined according to the login session. The graphical user interface may also have a view that is customized according to the identity of the user or according to the authorization level of the login session.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

As described previously, computing systems used by organizations may be implemented with numerous types of services. Operating in a distributed fashion, services may interact with one another and with users at varying levels to enhance their utility and performance. Interaction among multiple services, however, may pose problems when used in a secure environment in which information used by the services are categorized according to various authorization levels. Organizations such as the military branch of the government, for example, may use computing systems implemented with differing types of services that process information configured in a multi-tiered security scheme. Information categorized in a multi-tiered security scheme may be difficult to manage due to the differing services that may each require authentication prior to use. Moreover, interaction of the various services with one another using a multi-tiered security scheme may encumber the performance of the computing system or worse, cause security leaks if not handled correctly.

Figure 1:
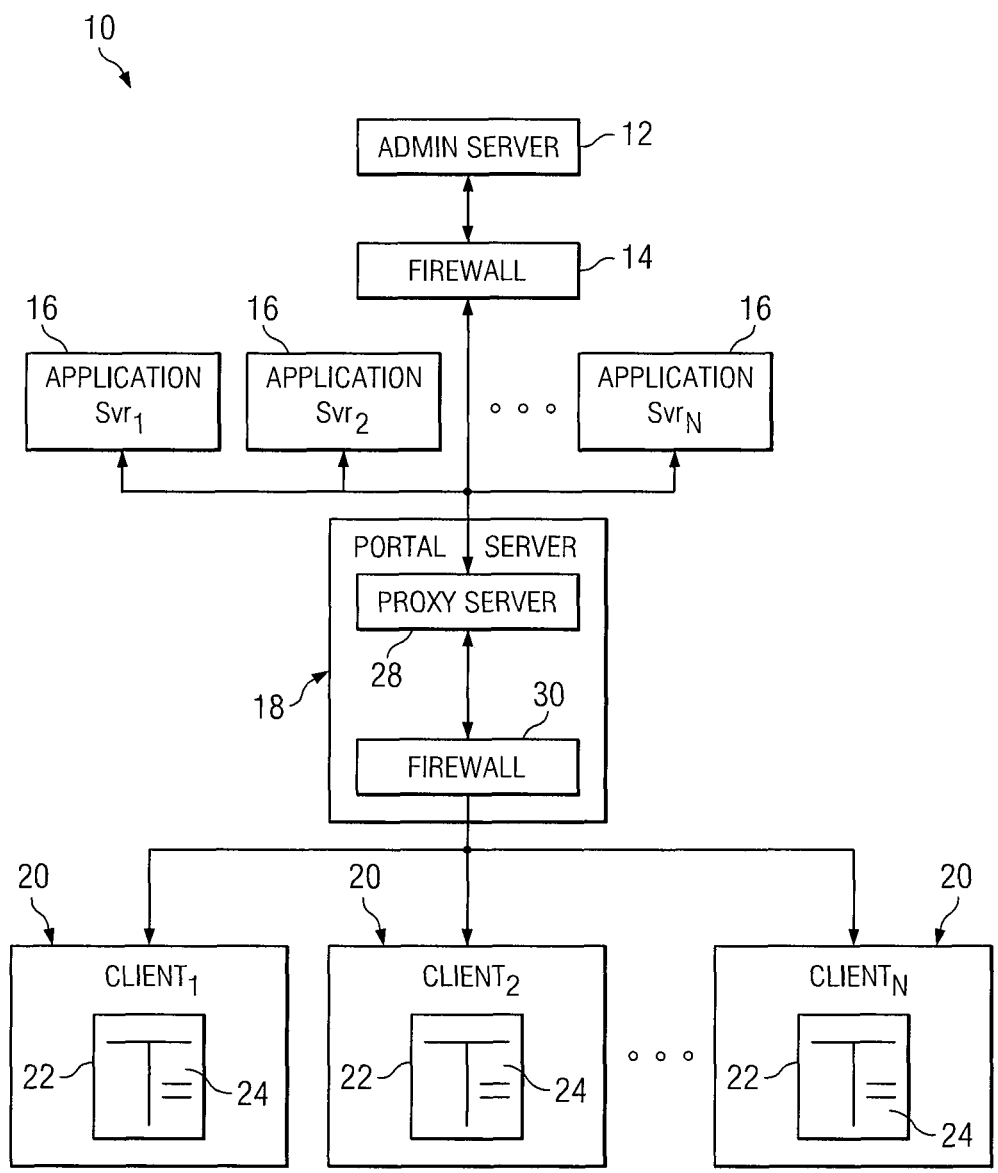
FIG. 1 is a block diagram showing one embodiment of a secure portal network according to the teachings of the present disclosure.

FIG. 1 shows one embodiment of a secure portal network 10 that may provide a solution to these problems and other problems. Secure portal network 10 includes an administrative server 12, a firewall 14, a number of application servers 16, and a portal server 18 that are coupled to a number of clients 20 as shown. Clients 20 may execute a graphical user interface (GUI) 22 that serves as a portal for services served by application servers 16. According to the teachings of the present disclosure, portal server 18 restricts access to services and associated information served by application servers 16 according to a particular authorization level associated with the graphical user interface 22.

Application servers 16 may each include instructions that are stored in a computer readable medium and executed on a computer processor. Application servers 16 may provide any desired type and number of services used by an organization. In the particular embodiment shown, services available on the secure portal network 10 are provided by a number of application servers 16. In other embodiments, services and associated information may be provided by a single application server 16 that serves the computing needs of the organization. Examples of services may include e-mail messaging programs, calendar programs, voice over Internet protocol (VOIP) programs, instant messaging programs, and word processing programs.

Services served by the one or more application servers 16 may include a database storage tool that stores information in the form of files and selectively allows access to these files according to an authorization level. In another embodiment, information stored may include tags indicating its authorization level. For example, information in the form of files may include a metadata portion indicating the authorization level of its associated file. In response to a request to access one or more files from graphical user interface 22, portal server 18 reads the tags of files and restricts access to any of these files having an authorization level that exceeds the authorization level of the graphical user interface 22.

Application servers 16 may store and/or process information in a multi-tiered fashion. For example, an organization, such as the United States Army, may organize information in various levels of confidentiality that may include unclassified, confidential, secret, and top-secret confidentiality levels. Within each of these confidentiality levels, information may be further organized in sub-confidentiality levels referred to as caveats. Caveats are generally associated with particular missions or other activities of the organization. Users may have clearance to view information having one particular sub-confidentiality level while being restricted from others. To avoid memory leaks, users logged in through graphical user interface 22 are restricted to information according to an authorization level, which may include a particular confidentiality level and one or more sub-categories associated with the login session.

Portal server 18 provides mandatory access control (MAC) for files that are served to clients 20. That is, portal server 18 enforces restrictive access to services and associated information according to the confidentiality level of the login session. In one embodiment, information used by services may be stored in application servers 16 in an encrypted format that is decrypted only for login sessions having sufficient authorization to view the information.

Graphical user interface 22 provides a point of interaction for services provided by secure portal network 10. Graphical user interface 22 includes a set of instructions that may be stored in a computer readable medium and executed on a suitable computer processor. Graphical user interface 22 has a number of service access points 24 that provides access to services and/or information served by application servers 16. Access to graphical user interface 22 and associated service access points 24 by a user may be regulated according to a login session. Thus, the user of graphical user interface 22 may have access to content and/or services provided by application servers 16 having an appropriate authorization level.

Certain embodiments may provide an advantage in that graphical user interface 22 forms a compartmented web portal for secure information by a user of secure portal network 10. Within a login session of graphical user interface 22, the user has access to information from differing services according to the authorization level of the login session. In one aspect, secure portal network 10 may provide access to services and information stored in application servers 16 according to a single sign-on (SSO) method of access control. For example, a particular user may desire to edit an existing file using a word processor and transmit this edited file to another user. Secure portal network 10 provides an approach for the user to perform both actions following a single login session through graphical user interface 22.

Association of graphical user interface 22 with the authorization level of information stored in application servers 16 may be provided by any suitable approach. In one embodiment, administrative server 12 stores the authorization levels of various users that may login to graphical user interface 22. Administrative server 12 includes a set of instructions that are stored in a memory and executed on a computer processor. In one embodiment, administrative server 12 is coupled to portal server 18 through firewall 14. Firewall 14 limits direct access to administrative server 12 by clients 20. Firewall 14 may also serve as a barrier to illicit access by either application server 16 and/or by operations performed by application servers 16. That is, firewall 14 may restrict access by a service or other entity that attempts to access authorization information stored in administrative server 12 in an illicit manner.

In the particular embodiment shown, portal server 18 includes a proxy server 28 and a firewall 30. Proxy server 28 and firewall 30 may include a set of instructions stored in a memory and executed by a computer processor. Proxy server 28 provides a level of indirection for application servers 16 from graphical user interface 22. To access services and associated content from application servers 16, graphical user interface 22 accesses proxy server 28 rather than directly addressing application servers 16. In this manner, address information of application servers 16 are veiled from graphical user interface 22 to reduce the possibility of illicit intrusion of application servers 16 through graphical user interface 22. Proxy server 28 may be implemented by any quantity of computing systems. The quantity and type of computing systems implementing proxy server 28 may be determined according to the loading of services executed on application servers 16. For example, proxy server 28 may include a computing system for each service that may experience relatively high demand while other services may be served through a single computing system.

Firewall 30 restricts access to application servers 16 and/or proxy server 28 by graphical user interface 22. In one embodiment, firewall 30 restricts access to application servers 16 and/or proxy server 28 using a set of rules that selectively allow or disallow the passage of packets between application servers 16 and graphical user interface 22. For example, firewall 30 may allow access to application servers 16 and proxy server 28 by requests for information from service access points 24 while rejecting access through other accessing techniques. Thus, application servers 16 may be protected from illicit access by packet spoofing or other hacking techniques.

In one embodiment, portal server 18 may provide secure services according to a profile generated by according to an asynchronous javascript and XML (AJAX) web development technique. The asynchronous javascript and XML web development technique provides a structure for graphical user interface 22 that is customizable according to its authorization level. Thus, executable code that drives the display of graphical user interface 22 may selectively allow view of content from application servers 16 according to the authorization level of the login session.

Figure 2:
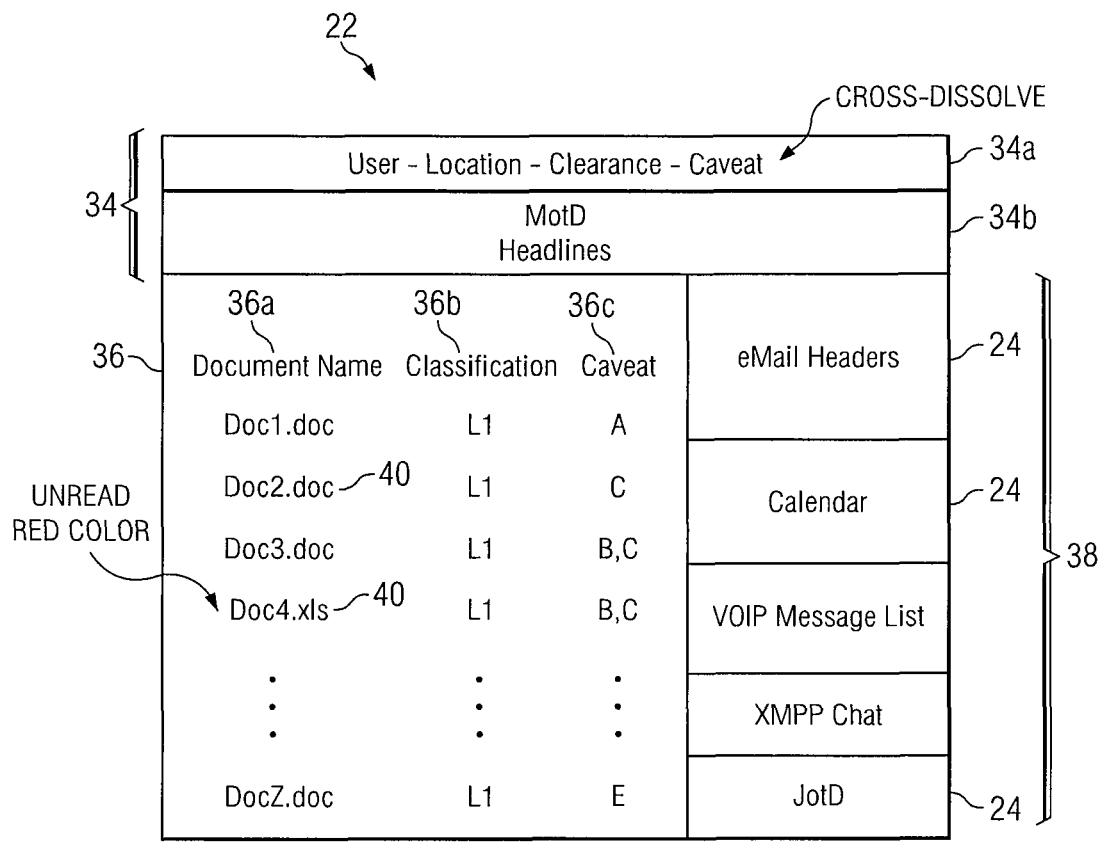
FIG. 2 is an illustration showing one embodiment of a graphical user interface that may be used with the secure portal network of FIG. 1.

FIG. 2 is an illustration showing one embodiment of a graphical user interface 22 that may be used with the secure portal network 10 of FIG. 1. Graphical user interface 22 may be displayed by client 20 following a login procedure in which portal server 18 authenticates a particular user to initiate a login session. Graphical user interface 22 may be available to the user throughout the duration of the login session. Conclusion of the login session may be accomplished by logging out of graphical user interface 22. Graphical user interface 22 may be any suitable interactive display that encapsulates various secure services into a portal-like structure in which access is accomplished according to an authorization level of the login session. In one embodiment, graphical user interface 22 includes a web browser, such as a Firefox, Internet Explorer, or Opera application program that is executed on its respective client 20.

Graphical user interface 22 includes a header pane 34, a file pane 36, and a services pane 38. Header pane 34 includes a banner portion 34a and a message of the day (MoTD) portion 34b. Banner portion 34a displays textual information associated with the authorization level of the login session, such as user information, location, clearance level, and/or one or more caveats as text strings including alpha-numeric characters. In one embodiment, each instance of user information, location, clearance level, and one or more caveats is displayed using a cross-dissolve display technique. The cross-dissolve display technique causes one or a few instances of textual information to be alternatively displayed. In this manner, numerous instances of textual information may be made available for view on banner portion 34a of graphical user interface 22.

File pane 36 displays a list of files 40 in which the login session has sufficient authorization to view. File pane 36 includes a file name column 36a, a classification column 36b, and a caveat column 36c. The entry displayed in the classification column 36b and caveat column 36c displays the confidentiality level and sub-confidentiality levels, respectively, that may be associated with its file 40. In one embodiment, entries displayed in file name column 36a may be color-coded to indicate whether the associated file 40 has been previously read. For example, those files 40 which have been read may be black in color while those files 40 that have not been read may be red in color.

Services pane 38 includes one or more service access points 24 for a corresponding one or more secure services provided by secure portal network 10. Access to these services may be restricted according to the authorization level of the login session. Service access points 24 may include any suitable approach for accessing secure services from application servers 16. In one embodiment, service access point 24 may be a window having one or more widgets that display information and/or receive input from the user. In another embodiment, service access point 24 may be a hyper-text link that when selected, launches another window for providing interaction with the user. In another embodiment, service access point 24 may include abbreviated textual information that may be expanded upon selection by the user. In yet another embodiment, service access point 24 may include read-only information, such as a joke of the day (JotD) service.

Figure 3:
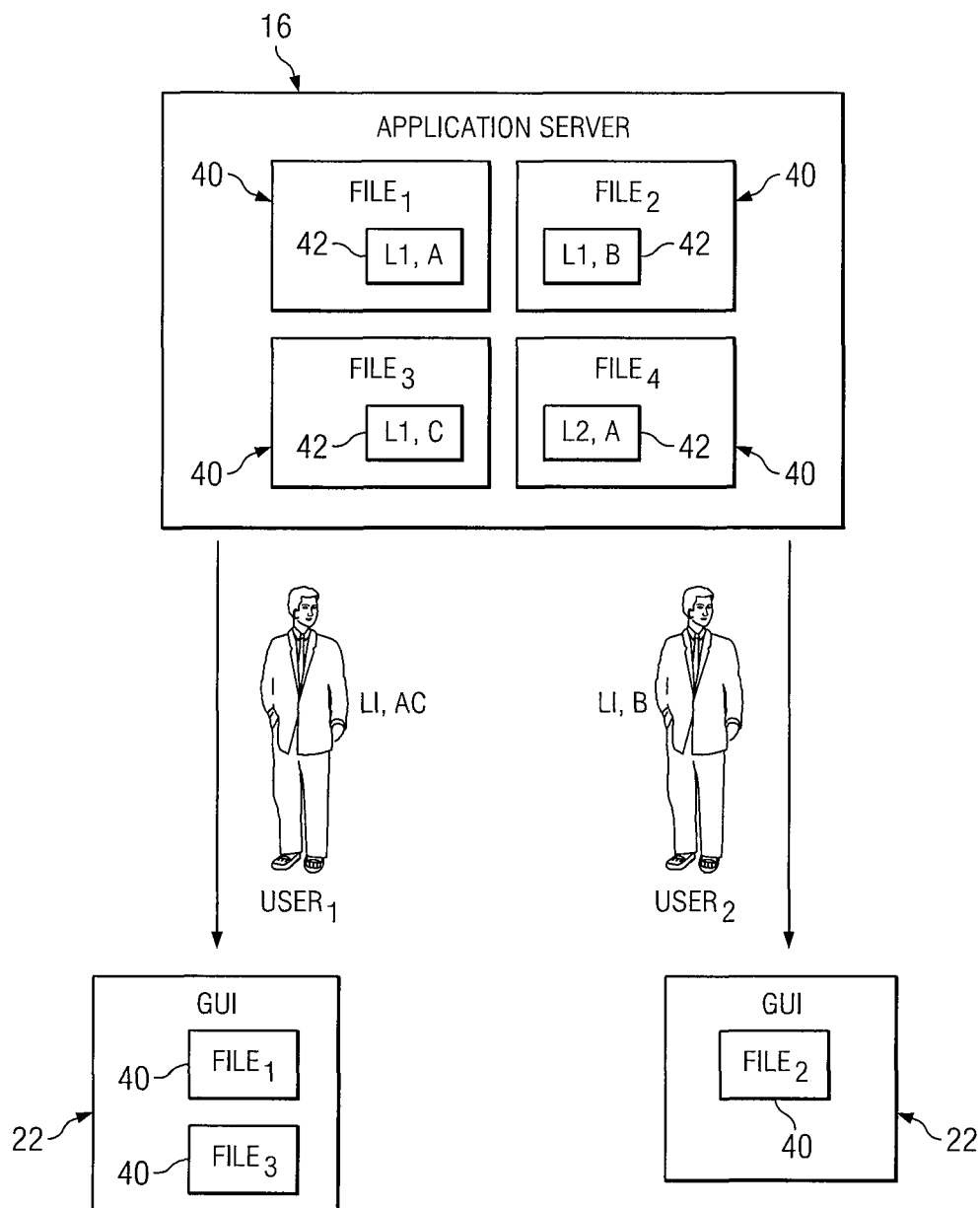
FIG. 3 is a diagram showing how the secure portal network may be used to access files from an application server of FIG. 1 in a secure manner.

FIG. 3 is an illustration showing how the secure portal system 10 may be used to access files from application server 16 in a secure manner. Application server 16 has a number of files 40 that are each associated with a particular authorization level. In the particular embodiment shown, each file has a tag 42 storing a multi-tiered authorization level including a confidentiality level and one or more sub-confidentiality levels. $User_1$ has an authorization level that in this particular example, has a level 1 (L1) confidentiality level with A and C sub-confidentiality levels. The authorization level and authentication information associated with $user_1$ may be stored in administrative server 12 (FIG. 1). When $user_1$ initiates a login session, portal server 18 (FIG. 1) allows access to those files in application server 16 for which $user_1$ has sufficient access rights, namely $file_1$ and $file_3$. Thus, portal server 18 restricts $file_2$ and $file_4$ from access according to the authorization level of the login session of graphical user interface 22a. In one embodiment, $file_2$ and $file_4$ may be stored in application server 16 as an encrypted file and decrypted by portal server 16 according to the authorization level of $user_1$. In another example, $user_2$ has an authorization level including a level 1 (L1) confidentiality level and a B sub-confidentiality level. For $user_2$, portal server 18 allows access to $file_2$ while restricting access to $file_1$, $file_3$, and $file_4$.

Modifications, additions, or omissions may be made to secure portal network 10 without departing from the scope of the invention. The components of secure portal network 10 may be integrated or separated. For example, proxy server 28 and firewall 30 of portal server 18 may be implemented on the same computing system or may be implemented on differing computers in which they communicate with one another using a transmission link, such as an Ethernet connection. Moreover, the operations of secure portal network 10 may be performed by more, fewer, or other components. In the particular embodiment shown for example, administrative server 12 is provided as a separate server that is decoupled from application servers 16 through firewall 30; however, functions provided by administrative server 12 may be integrated in application server 16 if security provided by firewall 30 is not needed or desired. Additionally, operations of the components of secure portal network 10 may be performed using any suitable logic comprising software, hardware, and/or other logic. As used in this document, "each" refers to each member of a set or each member of a subset of a set.

Figure 4:
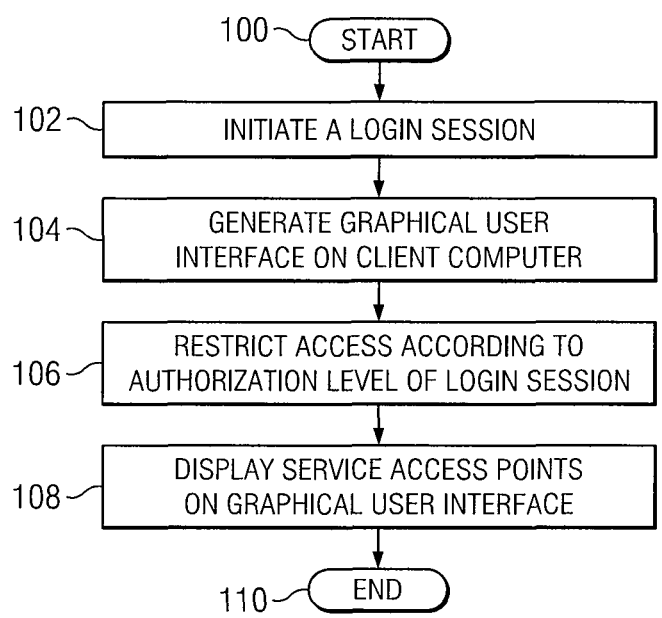
FIG. 4 is a flowchart showing one embodiment of a series of actions that may be performed to use the secure portal network of FIG. 1.

FIG. 4 shows one embodiment of a series of actions that may be performed by secure portal system 10 to publish content from one or more application servers 16 in a secure manner. In act 100, the process is initiated.

In act 102, a login session is initiated through graphical user interface 22. The login session may be accomplished by authenticating a particular user and subsequently associating the graphical user interface 22 with a particular authorization level. In one embodiment, the authorization level includes a multi-tiered authorization level including a confidentiality level and one or more sub-confidentiality levels.

In act 104, graphical user interface 22 is generated on client 20. Graphical user interface 22 may include a web browser configured with a number of service access points 24. In one embodiment, service access points 24 may be generated according to the authorization level used at login or may be customized according to each user using an asynchronous javascript and XML (AJAX) web development technique. The asynchronous javascript and XML web development technique may also promote interoperability of secure services among one another within the login session of graphical user interface 22. In one embodiment, the asynchronous javascript and XML web development technique provides an approach to customizing the display of the various service access points 24 as displayed on graphical user interface 22. For example, the user may selectively remove certain files from view or may add other files for view based upon their type.

In act 106, access to secure services in application servers 16 may be restricted according to the authorization level of the graphical user interface 22. As an example in which a particular secure service is an e-mail messaging tool, the e-mail messaging tool may restrict the ability to transmit or receive certain broadcast messages based upon the authorization level of the graphical user interface 22. Restricted access to secure services may be provided by portal server 18. Portal server 18 includes a proxy server 28 that veils the actual address of application servers 16 from graphical user interface 22 and a firewall 30 that restricts access to proxy server 28 from illicit requests. In a particular embodiment in which application server 16 is a storage device that stores files, portal server 18 may decrypt files in storage device according to the authorization level of the login session.

In act 108, service access points 24 are for each of the services supplied by application servers 16 are displayed in the graphical user interface 22. Service access points 24 provide interactive access to the various secure services according to the authorization level of the login session. Service access points 24 may include any suitable interactive technique that displays content for view and receives input request from the user of graphical user interface 22. For example, service access points 24 include windows having one or more widgets of a web browser that may be selected to access its associated secure service that it references. In a particular embodiment in which application server 16 is a storage device that stores files, portal server 18 displays the decrypted files on graphical user interface 22.

The previously described process continues throughout the duration of the login session. When the login session is canceled by logging out of the login session, the process ends in act 110.

Modifications, additions, or omissions may be made to the method described above without departing from the scope of the disclosure. The method may include more, fewer, or other acts. For example, initiation of a login session may include recording failed login attempts for security leak prevention analysis. Further successful login attempts may be recorded for periodic monitoring of the type and level of usage.

Although several embodiments have been illustrated and described in detail, it will be recognized that substitutions and alterations are possible without departing from the spirit and scope of the present disclosure, as defined by the following claims.

What is claimed is:

1. A secure portal system comprising:
a plurality of application servers each operable to provide a plurality of secure services over a network;
a plurality of client computers each operable to display a graphical user interface; and
a portal server communicatively connected between the plurality of application servers and the plurality of client computers, the portal server including a first firewall and a proxy server, the first firewall communicatively connected between the plurality of client computers and the proxy server, the proxy server communicatively connected between the first firewall and the plurality of application servers, the first firewall operable to restrict packet access to the at least one application server according to a set of rules, the proxy server operable to provide a level of indirection for the plurality of application servers from the graphical user interface, wherein the client computers communicate to the application server by communicating to the first firewall and then communicating with the proxy server;
an administrative server operable to store authorization level information associated with each of a plurality of users of the client computers;
a second firewall communicatively connected between the administrative server and the proxy server, the second firewall to restrict access to the authorization level information;
the portal server further operable to:
create a login session with the graphical user interface, the login session being associated with one or more authorization levels among a plurality of authorization levels, wherein at least one of the one or more authorization levels includes a confidentiality level and one or more sub-confidentiality levels, wherein the confidentiality level is one of a hierarchy of confidentiality levels and the one or more sub-confidentiality levels are each associated with an activity to be carried out by an organization associated with the plurality of client computers;
display, on the graphical user interface, a service access point for each of the plurality of secure services;
restrict access to each of the plurality of secure services according to the confidentiality level and the sub-confidentiality level of the login session; and
wherein one of the plurality of secure services comprises a storage device that stores a plurality of files, each of the plurality of files having a metadata tag indicating a file confidentiality level and sub-confidentiality level of its respective file, the portal server operable to restrict access to the storage device by comparing the authorization level of the login session with the file authorization level of each of the plurality of files.

2. The secure portal system of claim 1, wherein the portal server is further operable to display textual content using a cross-dissolve display technique.

3. A secure portal access method comprising:
creating a login session with a graphical user interface, the login session being associated with one or more authorization levels among a plurality of authorization levels, the one or more authorization levels including a confidentiality level and a sub-confidentiality level, the confidentiality level indicating a level of a hierarchy of confidentiality levels for which the login session has clearance to access information regarding, the sub-confidentiality level indicating an activity to be carried out by an organization associated with the login session for which the login session has clearance to access information regarding;
displaying, on the graphical user interface, a service access point for each of a plurality of secure services, the plurality of secure services communicating with the graphical user interface through a network;
restricting access to each of the plurality of secure services according to the one or more authorization levels of the login session and according to a set of rules configured in a first firewall;
misdirecting a communication from the graphical user interface to the first firewall through a proxy server communicatively connected between the first firewall and the secure services, wherein the graphical user interface communicates to the service services by communicating to the first firewall and then communicating with the proxy server;
restricting access to an administrative server according to the one or more authorization levels of the login session and according to a set of rules configured in a second firewall communicatively connected between the proxy server and the administrative server, the administrative server including authorization level information associated with each of a plurality of users of the plurality of graphical user interfaces stored thereon; and
wherein displaying a service access point for each of a plurality of secure services comprises displaying a service access point for a storage device that stores a plurality of files, each of the plurality of files having a metadata tag that indicates a file confidentiality level and a sub-confidentiality level of its respective file, and restricting access to the storage device by comparing the confidentiality level and the sub-confidentiality level of the login session with the file confidentiality level and a sub-confidentiality level of each of the plurality of files.

4. The secure portal access method of claim 3, further comprising displaying, on the graphical user interface, textual content using a cross-dissolve display technique.

5. A non-transitory computer-readable medium having code embodied thereon, the code operable, when executed by a machine, to cause the machine to perform at least the following:
create a login session with a graphical user interface, the login session being associated with one or more authorization levels among a plurality of authorization levels, the one or more authorization levels including a confidentiality level and a sub-confidentiality level, the confidentiality level indicating a level of a hierarchy of confidentiality levels for which the login session has clearance to access information regarding, the sub-confidentiality level indicating an activity to be carried out by an organization associated with the login session for which the login session has clearance to access information regarding;
display, on the graphical user interface, a service access point for each of a plurality of secure services, the plurality of secure services communicating with the graphical user interface through a network;

restrict access to each of the plurality of secure services according to the one or more authorization levels of the login session and according to a set of rules configured in a first firewall;

misdirect a communication from the graphical user interface to the firewall through a proxy server communicatively connected between the firewall and the secure services, wherein the graphical user interface communicates to the service services by communicating to the first firewall and then communicating with the proxy server;

restrict access to an administrative server according to the one or more authorization levels of the login session and according to a set of rules configured in a second firewall communicatively connected between the proxy server and the administrative server, the administrative server including authorization level information associated with each of a plurality of users of the plurality of graphical user interfaces stored thereon; and wherein displaying a service access point for each of a plurality of secure services comprises displaying a service access point for a storage device that stores a plurality of files, each of the plurality of files having a metadata tag that indicates a file confidentiality level and a sub-confidentiality level of its respective file, and restricting access to the storage device by comparing the confidentiality level and the sub-confidentiality level of the login session with the file confidentiality level and a sub-confidentiality level of each of the plurality of files.

6. The non-transitory computer-readable medium of claim 5, further comprising displaying, on the graphical user interface, textual content using a cross-dissolve display technique.

7. The secure portal system of claim 1, wherein the graphical user interface comprises a web browser having a plurality of windows, the service access point for each of the plurality of secure services comprising one of the plurality of windows.

8. The secure portal access method of claim 3, wherein creating a login session with a graphical user interface comprises creating a login session with a web browser having a plurality of windows, the service access point for each of the plurality of secure services comprising one of the plurality of windows.

9. The non-transitory computer-readable medium of claim 5, wherein creating a login session with a graphical user interface comprises creating a login session with a web browser having a plurality of windows, the service access point for each of the plurality of secure services comprising one of the plurality of windows.

10. The secure portal system of claim 1, wherein the set of rules that selectively allow or disallow the passage of packets between application servers and graphical user interface.

11. The secure portal access method of claim 3, wherein the set of rules that selectively allow or disallow the passage of packets between the service access point and the graphical user interface.

12. The non-transitory computer-readable medium of claim 5, wherein the set of rules that selectively allow or disallow the passage of packets between the service access point and the graphical user interface.

13. The secure portal system of claim 1, wherein the plurality of files are stored in an encrypted format and wherein the portal server is operable to decrypt the plurality of files.

14. The secure portal system of claim 1, wherein the graphical user interface of each of the client computers includes a file pane that displays only files that include an authorization level consistent with the authorization level of the login session.

15. The secure portal system of claim 1, wherein the graphical user interface includes a plurality of service access points defined in an asynchronous javascript and extensible markup language technique, where each access point is associated with a different view on the graphical user interface as defined by the asynchronous javascript and extensible markup language technique.

16. The secure access method of claim 3, further comprising storing the plurality of files in an encrypted format and decrypting, using the portal server, the plurality of files.

17. The secure access method of claim 3, further comprising displaying, using the graphical user interface, a file pane that includes a display of only files that include an authorization level consistent with the authorization level of the login session.

18. The secure access method of claim 3, wherein the service access points are defined using an asynchronous javascript and extensible markup language technique, where each service access point is associated with a different view on the graphical user interface as defined by the asynchronous javascript and extensible markup language technique.

19. The non-transitory computer readable medium of claim 5, further comprising code embodied thereon, the code operable, when executed by a machine, to cause the machine to store the plurality of files in an encrypted format and decrypting, using the portal server, the plurality of files.

20. The non-transitory computer readable medium of claim 5, further comprising code embodied thereon, the code operable, when executed by a machine, to cause the machine to display, using the graphical user interface, a file pane that includes a display of only files that include an authorization level consistent with the authorization level of the login session.

* * * * *

UNITED STATES PATENT AND TRADEMARK OFFICE
CERTIFICATE OF CORRECTION

| | | |
|---|---|---|
| PATENT NO. | : 9,172,709 B2 | Page 1 of 1 |
| APPLICATION NO. | : 12/145363 | |
| DATED | : October 27, 2015 | |
| INVENTOR(S) | : Dean et al. | |

It is certified that error appears in the above-identified patent and that said Letters Patent is hereby corrected as shown below:

In the Specification

In column 5, line 41, delete "22a." and insert --22.--, therefor

In column 5, line 43, delete "16" and insert --18--, therefor

Signed and Sealed this
Twenty-second Day of March, 2016

Michelle K. Lee
*Director of the United States Patent and Trademark Office*